(12) United States Patent
Helber

(10) Patent No.: US 12,578,084 B2
(45) Date of Patent: Mar. 17, 2026

(54) ROOF-MOUNTED EMERGENCY BEACON

(71) Applicant: Todd Allen Helber, Mount Gilead, OH (US)

(72) Inventor: Todd Allen Helber, Mount Gilead, OH (US)

( * ) Notice: Subject to any disclaimer, the term of this patent is extended or adjusted under 35 U.S.C. 154(b) by 0 days.

(21) Appl. No.: 19/013,995

(22) Filed: Jan. 8, 2025

(65) Prior Publication Data

US 2025/0224103 A1     Jul. 10, 2025

Related U.S. Application Data

(60) Provisional application No. 63/618,601, filed on Jan. 8, 2024.

(51) Int. Cl.
| | |
|---|---|
| *F21V 21/22* | (2006.01) |
| *B60Q 1/26* | (2006.01) |
| *B60Q 3/57* | (2017.01) |
| *B64F 1/20* | (2006.01) |
| *E04B 7/16* | (2006.01) |
| *F21S 8/02* | (2006.01) |
| *F21S 10/02* | (2006.01) |
| *F21S 10/06* | (2006.01) |
| *F21V 14/06* | (2006.01) |
| *F21V 15/01* | (2006.01) |

(Continued)

(52) U.S. Cl.
CPC .............. *F21V 21/22* (2013.01); *F21S 10/02* (2013.01); *F21V 21/15* (2013.01); *G08B 5/38* (2013.01); *G08B 7/064* (2013.01); *B60Q 1/2657* (2013.01); *B60Q 1/2692* (2013.01); *B60Q 3/57* (2017.02); *B64F 1/20* (2013.01);

*B64F 1/205* (2013.01); *E04B 7/166* (2013.01); *F21S 8/028* (2013.01); *F21S 10/06* (2013.01); *F21S 10/063* (2013.01); *F21S 10/066* (2013.01); *F21V 14/06* (2013.01); *F21V 14/065* (2013.01); *F21V 15/012* (2013.01); *F21W 2121/004* (2013.01); *F21W 2131/107* (2013.01); *F21Y 2113/10* (2016.08); *G08B 5/36* (2013.01); *H01Q 1/06* (2013.01); *H01Q 1/08* (2013.01); *H01Q 1/10* (2013.01)

(58) Field of Classification Search
CPC ........ F21V 15/012; F21V 21/15; F21V 21/22; F21V 14/06; F21V 14/065; G08B 5/36; G08B 5/38; G08B 7/064; F21S 10/06; F21S 10/063; F21S 10/066; F21S 8/028; B60Q 1/2657; B60Q 1/2692; B60Q 3/57; B64F 1/20; B64F 1/205; H01Q 1/06; H01Q 1/08; H01Q 1/10; F21W 2121/004; F21W 2131/107; E04B 7/166
See application file for complete search history.

(56) References Cited

U.S. PATENT DOCUMENTS

| | | | | | |
|---|---|---|---|---|---|
| 2,738,492 | A | * | 3/1956 | Arneson .............. | B60Q 1/2657 |
| | | | | | 362/403 |
| 4,867,498 | A | * | 9/1989 | Delphia ................... | B60Q 3/56 |
| | | | | | 248/104 |

(Continued)

*Primary Examiner* — Colin J Cattanach

(57) ABSTRACT

A roof-mounted emergency beacon used to alert emergency responders and observers of the location of an emergency. The beacon is activated by a smoke alarm, burglar alarm, or medical emergency alarm. Upon activation, the beacon light flashes, and the beacon extends to increase visibility. The beacon illuminates different colors to indicate different types of emergencies. Upon deactivation, the beacon lowers to return to the stowed position.

6 Claims, 9 Drawing Sheets

(51) Int. Cl.

| | |
|---|---|
| *F21V 21/15* | (2006.01) |
| *F21W 121/00* | (2006.01) |
| *F21W 131/107* | (2006.01) |
| *F21Y 113/10* | (2016.01) |
| *G08B 5/36* | (2006.01) |
| *G08B 5/38* | (2006.01) |
| *G08B 7/06* | (2006.01) |
| *H01Q 1/06* | (2006.01) |
| *H01Q 1/08* | (2006.01) |
| *H01Q 1/10* | (2006.01) |

(56) References Cited

U.S. PATENT DOCUMENTS

| | | | | |
|---|---|---|---|---|
| 5,598,139 | A | 1/1997 | Karim et al. | |
| 6,547,410 | B1 * | 4/2003 | Pederson | F21V 29/70 |
| | | | | 362/524 |
| 10,093,226 | B1 * | 10/2018 | Lopez Gonzalez | B60Q 3/57 |
| 11,176,805 | B2 | 11/2021 | McNutt et al. | |
| 11,348,419 | B1 * | 5/2022 | Thomas | G08B 7/064 |
| 2008/0012716 | A1 | 1/2008 | Saltzstein et al. | |
| 2008/0013317 | A1 * | 1/2008 | Hinds | F21V 21/22 |
| | | | | 362/386 |
| 2011/0095902 | A1 * | 4/2011 | Mandel | G08B 5/36 |
| | | | | 340/815.4 |
| 2017/0046926 | A1 * | 2/2017 | Bauldree | G08B 7/064 |
| 2017/0114973 | A1 * | 4/2017 | Krumweide | G02B 19/0004 |
| 2019/0371148 | A1 * | 12/2019 | Bailey | H05B 45/20 |
| 2020/0082679 | A1 * | 3/2020 | Scalisi | G08B 25/001 |
| 2020/0098236 | A1 * | 3/2020 | Bauldree | G08B 3/1016 |
| 2021/0274591 | A1 | 9/2021 | Norcross | |
| 2021/0287521 | A1 | 9/2021 | Stone et al. | |

* cited by examiner

ROOF-MOUNTED EMERGENCY BEACON

FIELD OF THE INVENTION

The present invention relates generally to beacon lights. The present invention relates more specifically to emergency locator beacons.

BACKGROUND OF THE INVENTION

When an emergency occurs, it is critical to direct resources to the location of the emergency as quickly as possible. Typically, emergency responders are given the address of the emergency and must find the location of the emergency visually. In some cases, the address of the building is not displayed properly, delaying responders from finding the location of the emergency.

It is an objective of the present invention to direct attention to the building where an emergency is occurring. It is a further objective of the invention to provide a beacon that will direct emergency responders to the building. It is a further objective of the present invention to inform the public of an emergency at the building.

SUMMARY OF THE INVENTION

The present invention provides an apparatus for a roof-mounted emergency beacon. The roof-mounted emergency beacon is used to alert emergency responders and observers of the location of an emergency. The beacon is activated by a smoke alarm, burglar alarm, or medical emergency alarm. Upon activation, the beacon light flashes, and the beacon extends to increase visibility. The beacon illuminates different colors to indicate different types of emergencies. Upon deactivation, the beacon lowers to return to the stowed position.

DETAILED DESCRIPTION OF THE INVENTION

All illustrations of the drawings are for the purpose of describing selected versions of the present invention and are not intended to limit the scope of the present invention.

The present invention represents an emergency beacon that is mounted to the exterior of a building. The emergency beacon emits light to inform observers of an emergency and to direct emergency responders to the building. The emergency beacon may be raised to increase visibility.

Figure 1:
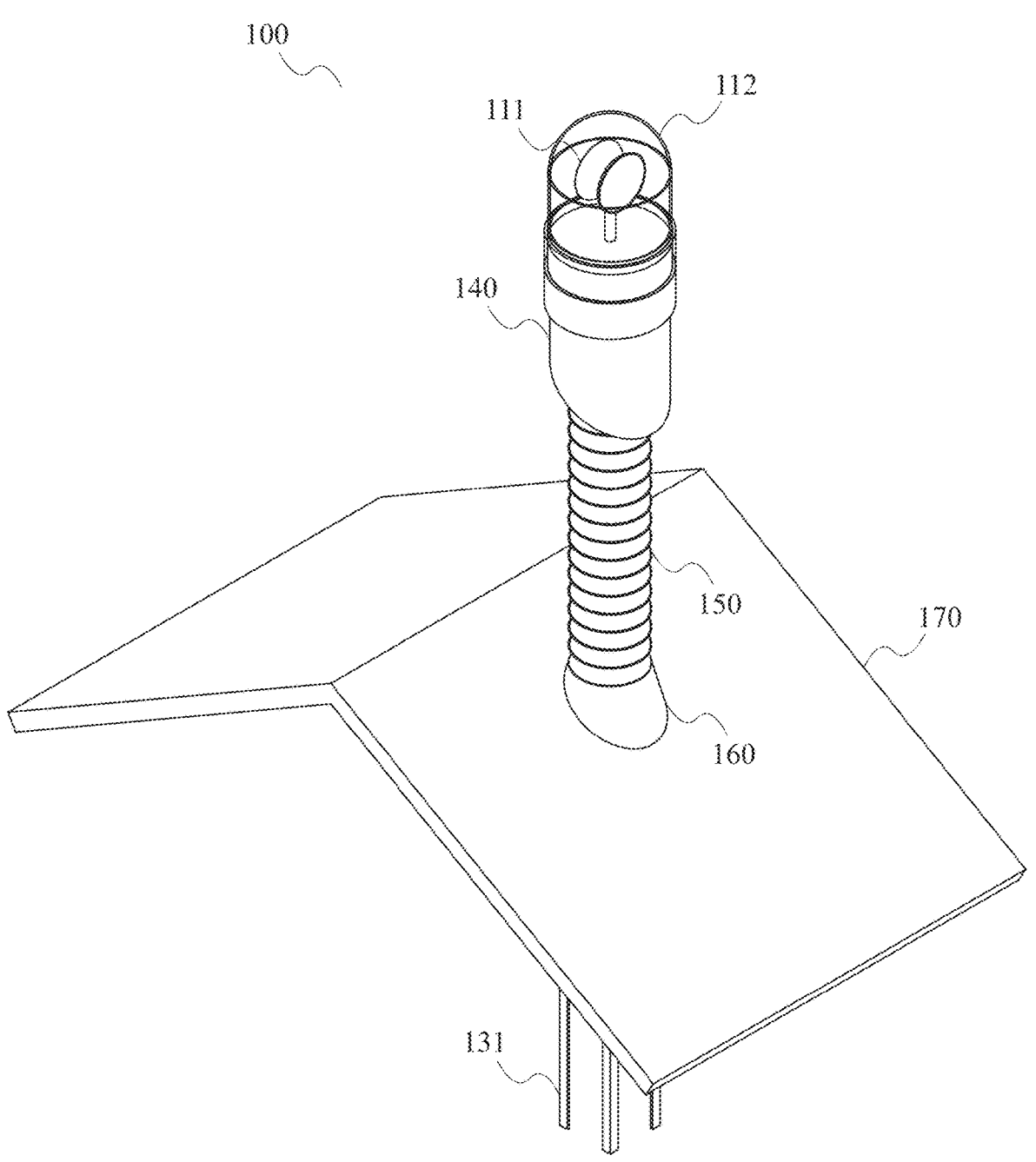
FIG. 1 is a perspective view of Embodiment 1 of the present invention in a first configuration.
Figure 2:
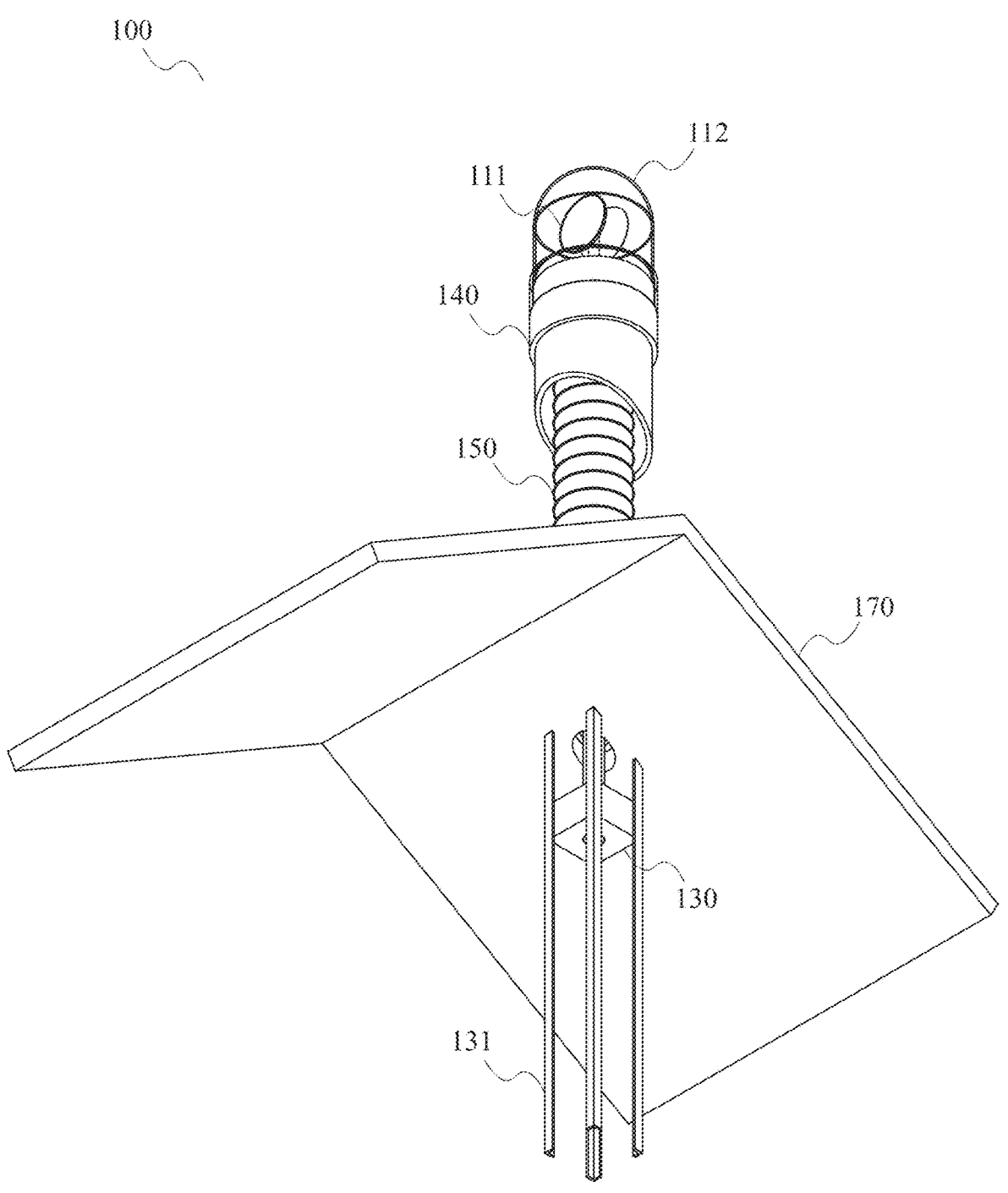
FIG. 2 is a perspective view of Embodiment 1 of the present invention in the first configuration.
Figure 3:
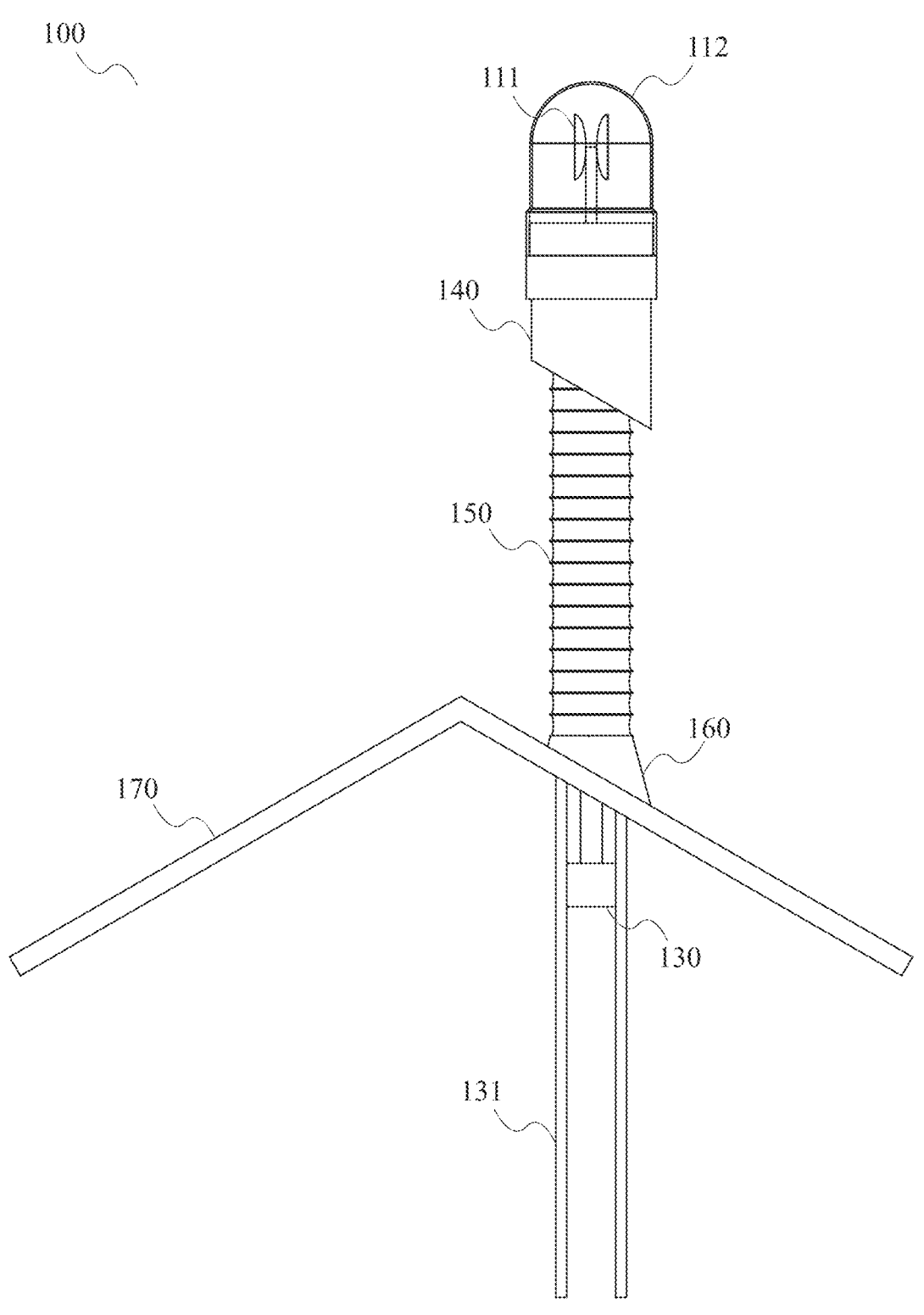
FIG. 3 is a front elevation view of Embodiment 1 of the present invention in the first configuration.
Figure 4:
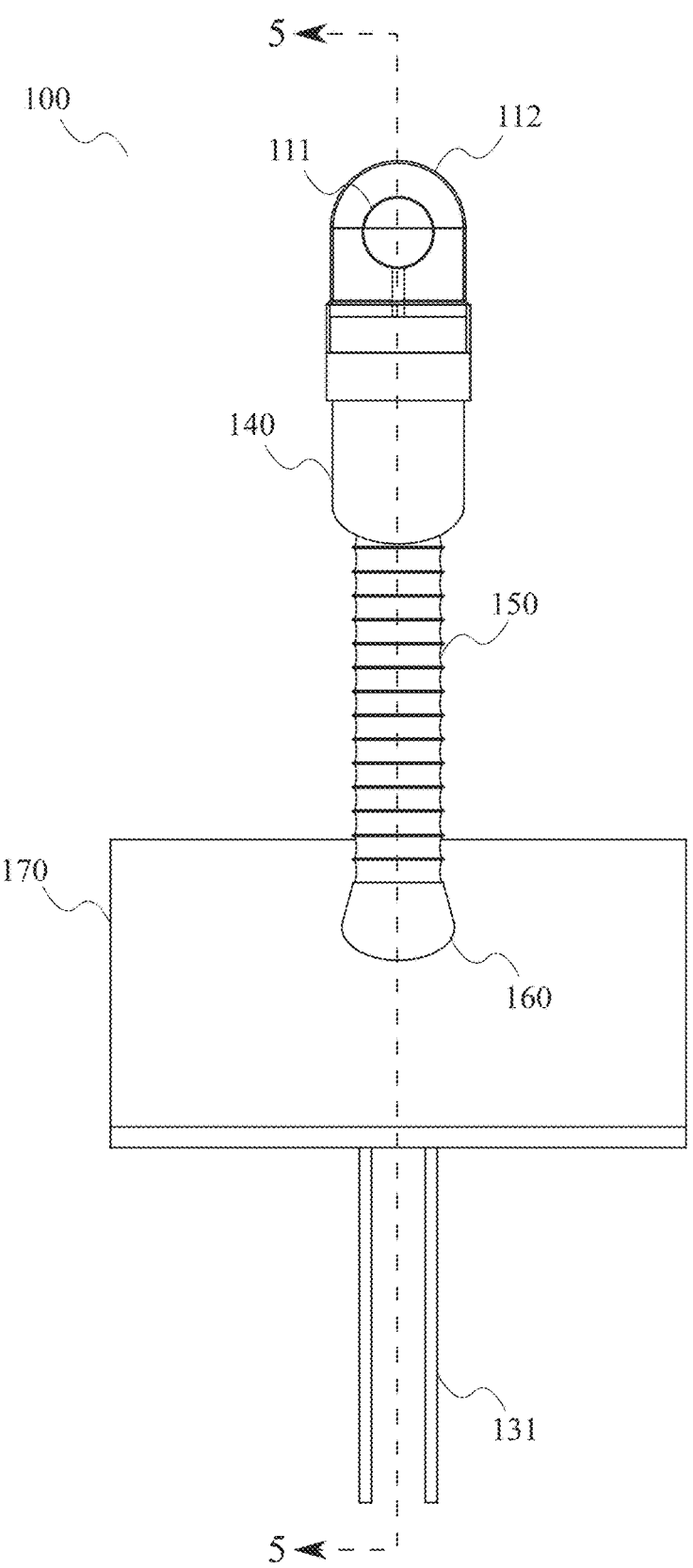
FIG. 4 is a right-side elevation view of Embodiment 1 of the present invention in the first configuration, showing a plane 5-5 upon which a sectional view is taken and shown in FIG. 5.
Figure 5:
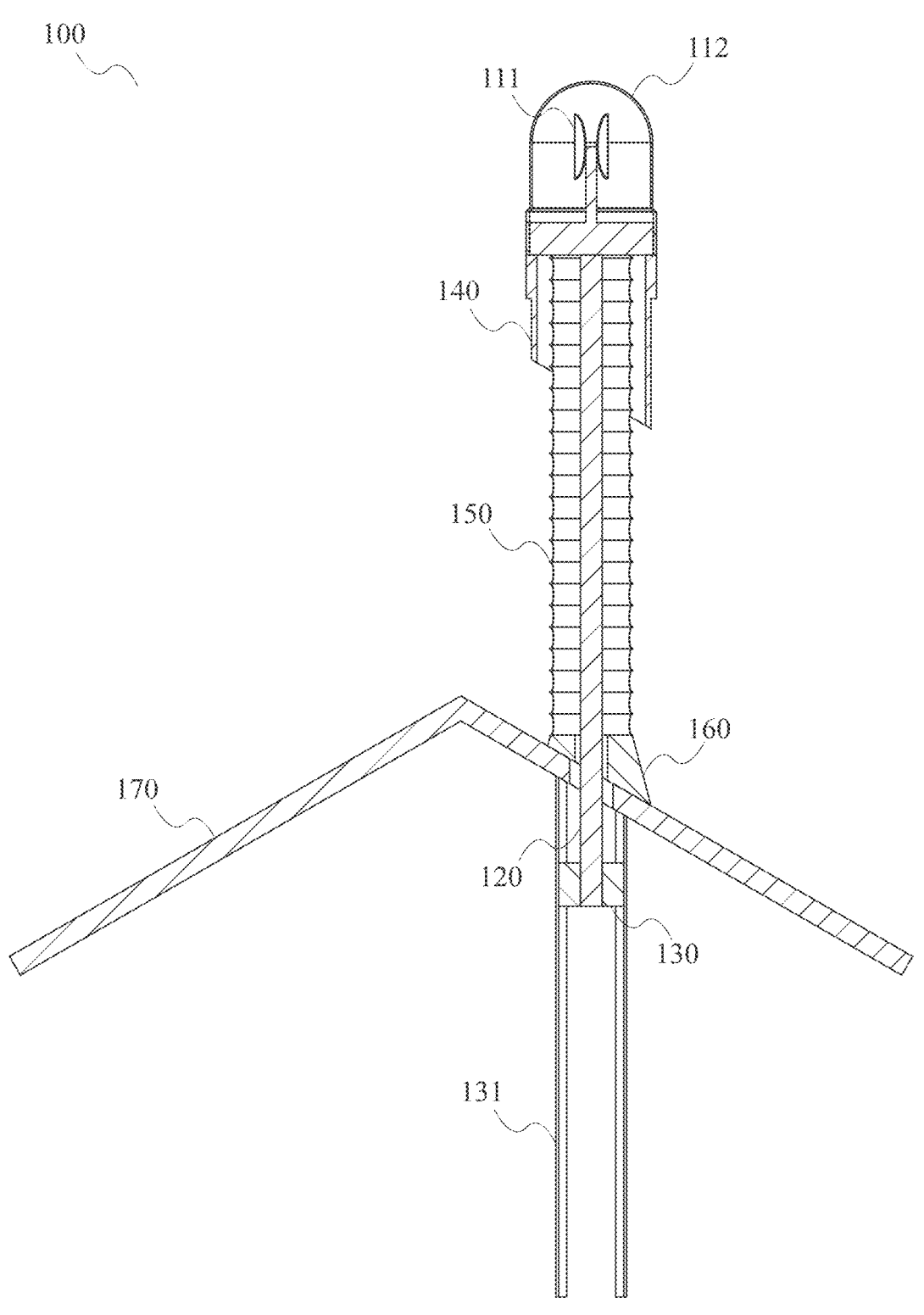
FIG. 5 is a sectional view of Embodiment 1 of the present invention in the first configuration, taken along line 5-5 of FIG. 4.
Figure 6:
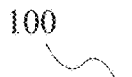
FIG. 6 is a perspective view of Embodiment 1 of the present invention in a second configuration.
Figure 6:
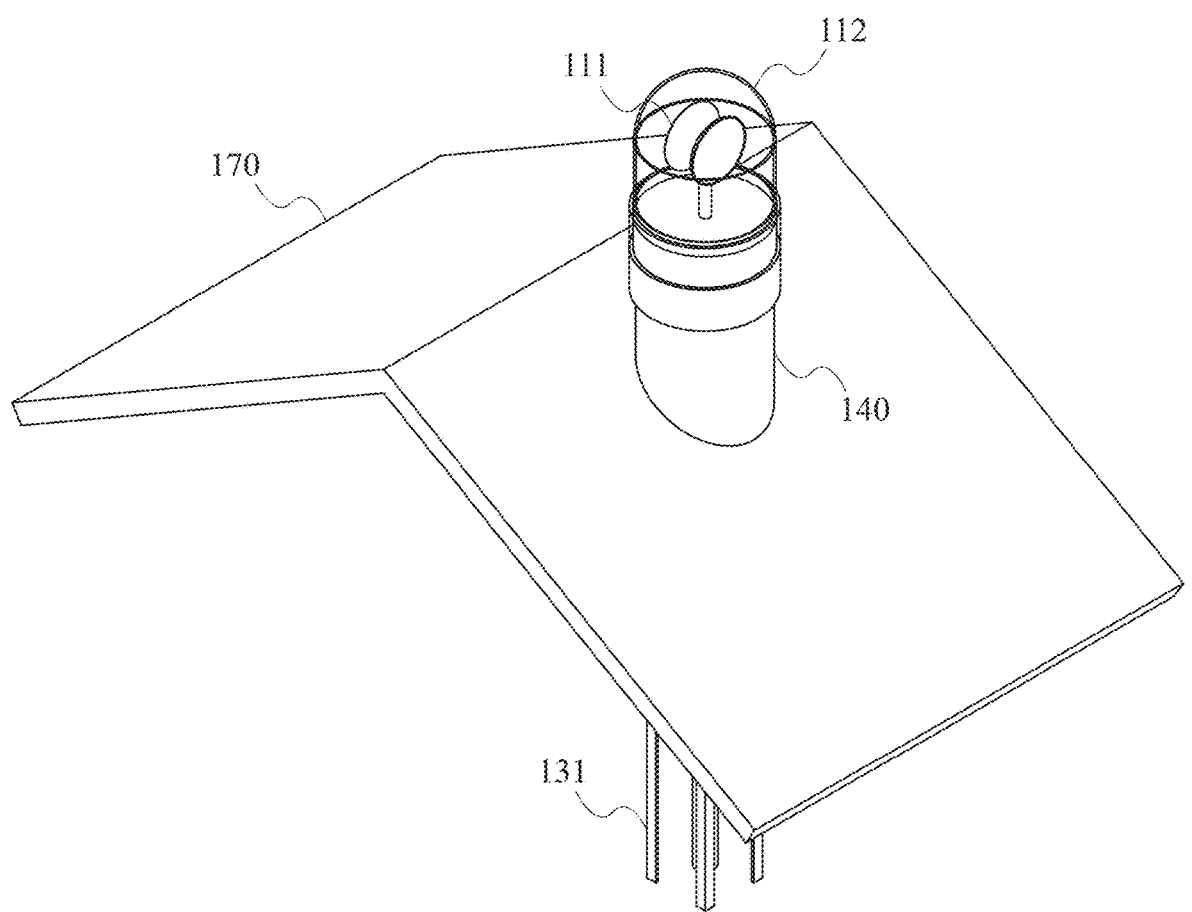
Figure 7:
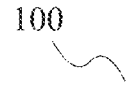
FIG. 7 is a front elevation view of Embodiment 1 of the present invention in the second configuration.
Figure 7:
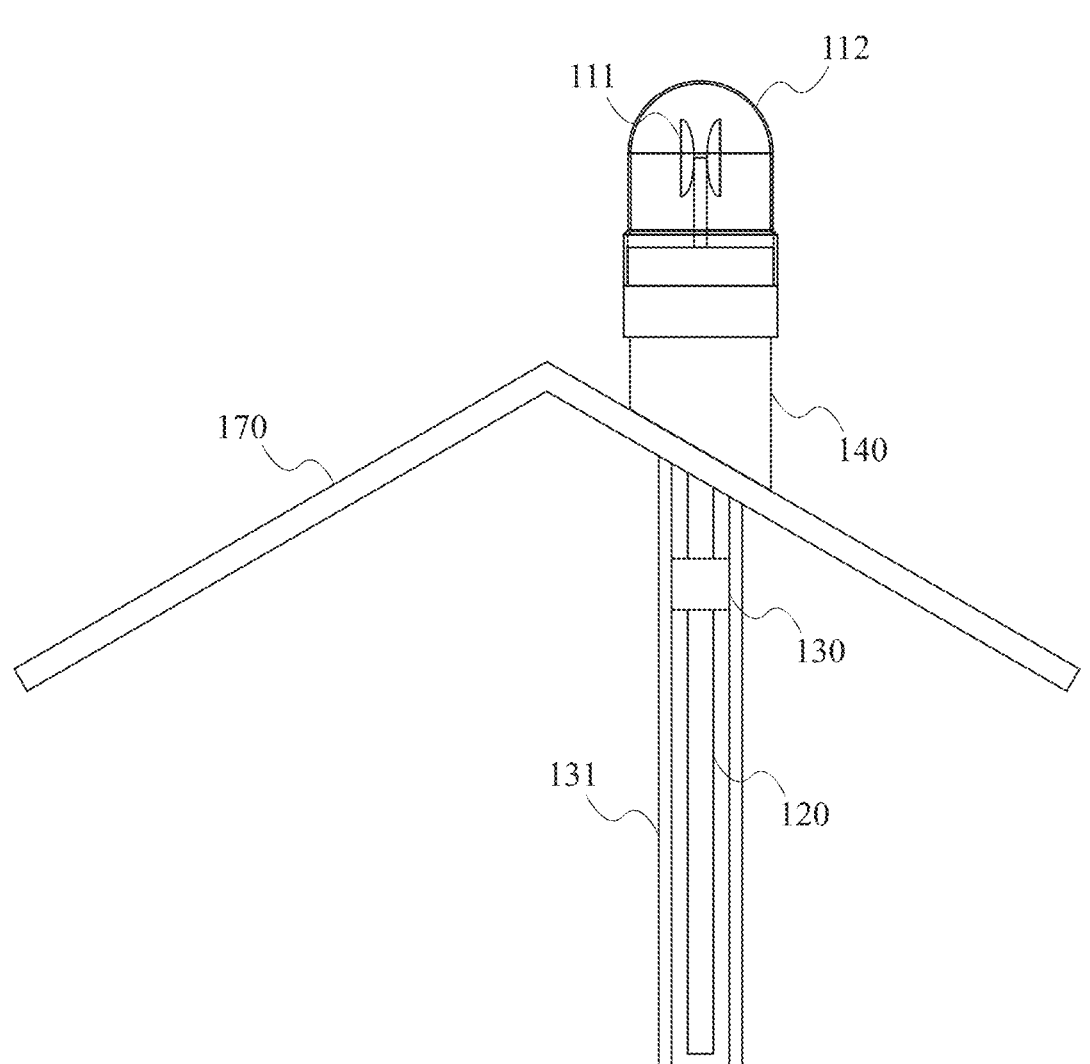
Figure 8:
FIG. 8 is a right-side view of Embodiment 1 of the present invention in the second configuration.
Figure 8:
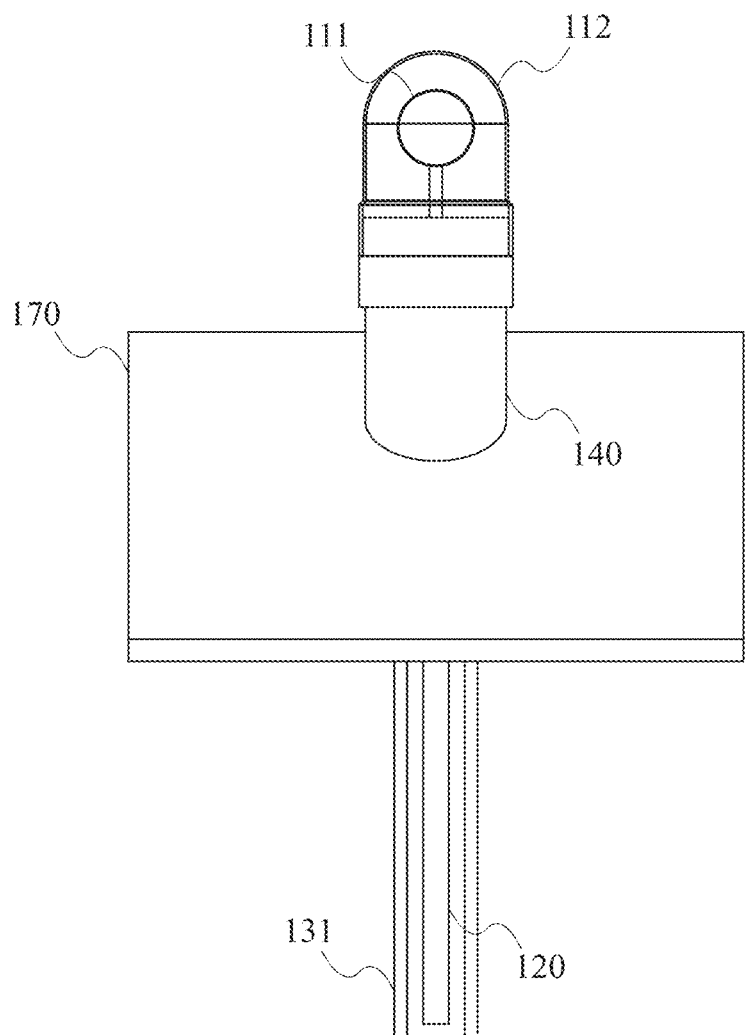
Figure 9:
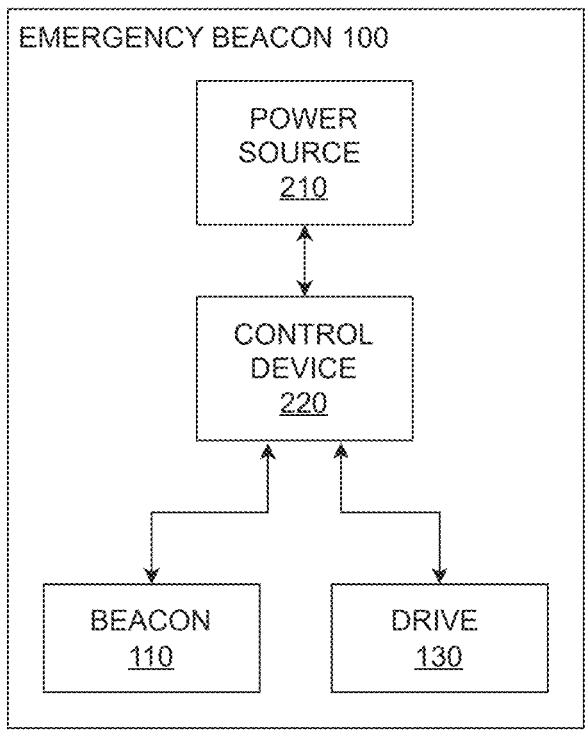
FIG. 9 is a block diagram of Embodiment 1 of the present invention.

Referring to FIGS. 1-9, Embodiment 1 of the present invention represents an emergency beacon 100. The emergency beacon 100 comprises a beacon 110, a shaft 120, a drive 130, a collar 140, an expanding cover 150, a roof mount 160, a power source 210, and a control device 220. In Embodiment 1, the emergency beacon 100 is mounted to a roof 170.

The beacon 110 comprises a beacon light 111 and a dome 112. The beacon light 111 comprises a light that may be illuminated in different colors. For example, the beacon light 111 contains red, green, and blue lights capable of combining to display any color of light. In another example, the beacon light 111 contains a light for each color that can be displayed. In Embodiment 1, the beacon light 111 illuminates with a red color to indicate a fire emergency. In Embodiment 1, the beacon light 111 illuminates with a blue color to indicate a police emergency, such as a burglary. In Embodiment 1, the beacon light 111 illuminates with a yellow color to indicate a flood emergency. In Embodiment 1, the beacon light 111 illuminates with a white light to indicate a medical emergency. In some embodiment, the beacon light 111 may spin within the dome 112 to create a flashing effect to observers. In other embodiments, the beacon light 111 illuminates intermittently to create the flashing effect. The beacon light 111 is mounted within the dome 112. The dome 112 provides protection from the weather. In Embodiment 1, the dome 112 is made from a transparent or translucent material, such that the light emitted from the beacon light 111 is visible through the dome 112.

The beacon 110 is mounted to the top of the shaft 120. The shaft 120 is mechanically connected to the drive 130. In Embodiment 1, gears inside the drive 130 engage with teeth on the shaft. The drive 130 is mounted to a support frame 131. The drive 130 raises and lowers the shaft 120 to raise and lower the beacon 110. As the drive 130 raises the shaft 120, the shaft 120 passes through the roof mount 160. The roof mount 160 provides an opening for the shaft 120 to pass through the roof 170. The collar 140 covers and protects the connection between the beacon 110 and the shaft 120. The expanding cover 150 covers and protects the shaft 120 when the beacon 110 is in the extended position. The top end of the expanding cover 150 connects to the bottom surface of the beacon light 111, and the bottom end of the expanding cover 150 connects to the roof mount 160. When the beacon 110 is in the stowed position, the expanding cover 150 is stored inside the collar 140.

In Embodiment 1, the roof 170 is a slanted roof. For example, the roof 170 may be the roof of a residence. In other embodiments, the roof may be flat. For example, the roof may be the roof of a commercial building.

The power source 210 provides electricity to the emergency beacon 100. The control device 220 controls the beacon 110 and the drive 130. The emergency beacon 100 further contains wiring necessary to power and control the various components. In some embodiments, the control device 220 includes a control panel. In some embodiments, the control device 220 connects wirelessly to a mobile device. In some embodiments, the control device 220 is connected to smoke detectors in the building. In some embodiments, the control device 220 is connected to fire alarms in the building. In some embodiments, the control device 220 is connected to break-in alarms in the building. In some embodiments, the control device 220 is connected to a medical emergency alarm. Upon activation of the control device 220, the control device 220 activates the beacon 110 to illuminate and activate the drive 130 to raise the shaft. For example, when a user inputs a fire emergency into the control device 220, the control device 220 activates the beacon 110 to illuminate a red light and activates the shaft to raise the beacon 110. Upon deactivation, the control device 220 deactivates the beacon 110 and activates the drive 130 to lower the beacon 110.

Although the invention has been explained in relation to its preferred embodiment, it is to be understood that many other possible modifications and variations can be made without departing from the spirit and scope of the invention as hereinafter claimed.

What is claimed is:

1. An emergency beacon, comprising:
a beacon light comprising a light source capable of emitting light along an adjustable spectrum of color;
a shaft;
a collar;
an expanding cover;
a drive;
a control device;
a power source; and
a roof mount;
wherein
the beacon light is mounted to the upper end of the shaft;
the collar protectively covers the mounting point between the beacon light and the shaft;
the expanding cover surrounds the upper portion of the shaft;
the shaft is mechanically connected to the drive;
the drive is configured to extend and retract the shaft;
the expanding cover is connected at its upper end to the beacon light;
the expanding cover is configured to extend and retract in coordination with the shaft;
the control device is electronically connected to the beacon light and the drive;
the control device is configured to operate the beacon light, adjust the beacon light's color, and operate the drive;
the control device is electrically connected to the power source;
the roof mount is configured to be connected to a roof;
the shaft traverses the roof;
the shaft traverses the roof mount;
the bottom of the expanding cover is configured to attach to the roof mount; and
the expanding cover extends and retracts in coordination with the shaft enveloping the portion of the shaft between the roof mount and the collar.

2. The emergency beacon of claim 1, wherein the drive is positioned such that it extends and retracts the shaft along a vertical axis.

3. The emergency beacon of claim 1, wherein:
the control device is configured to classify one or more different categories of emergency;
the control device is configured to receive input to indicate the occurrence of an emergency within the one or more categories;

the control device is configured to operate the beacon light's adjustable spectrum corresponding with one or more discrete colors;
each of the one or more discrete colors is distinct from one another;
each of the one or more discrete colors correlates to a singular different category of emergency configured to be recognized by the control device; and
the control device operates the beacon light emitting the discrete color correlated to the category of emergency it receives.

4. An emergency beacon comprising:
a beacon light comprising a light source capable of emitting light along an adjustable spectrum of color;
a shaft;
a collar;
an expanding cover;
a drive;
a roof mount;
a control device; and
a power source;
wherein
the beacon light is mounted to the upper end of the shaft;
the collar protectively covers the mounting point between the beacon light and the shaft;
the expanding cover surrounds the upper portion of the shaft;
the shaft is mechanically connected to the drive;
the drive is configured to extend and retract the shaft;
the roof mount is configured to be connected to a roof;
the shaft traversing the roof;
the shaft traversing the roof mount;
the expanding cover is connected at its upper end to the beacon light and its lower end to the roof mount;
the expanding cover is configured to extend and retract in coordination with the shaft, enveloping the portion of the shaft between the collar and the roof mount;
the control device is electronically connected to the beacon light and the drive;
the control device is configured to operate the beacon light, adjust the beacon light's color, and operate the drive; and
the control device is electrically connected to the power source.

5. The emergency beacon of claim 4, wherein the drive is positioned such that it extends and retracts the shaft along a vertical axis.

6. The emergency beacon of claim 4, wherein:
the control device is configured to classify one or more different categories of emergency;
the control device is configured to receive input to indicate the occurrence of an emergency within the one or more categories;
the control device is configured to operate the beacon light's adjustable spectrum corresponding with one or more discrete colors;
each of the one or more discrete colors is distinct from one another;
each of the one or more discrete colors correlates to a singular different category of emergency configured to be recognized by the control device; and
the control device operates the beacon light emitting the discrete color correlated to the category of emergency it receives.

* * * * *